US 8,494,302 B2

(12) United States Patent
Ding et al.

(10) Patent No.: US 8,494,302 B2
(45) Date of Patent: Jul. 23, 2013

(54) IMPORTANCE FILTERING FOR IMAGE RETARGETING

(75) Inventors: Yuanyuan Ding, Santa Clara, CA (US); Jing Xiao, Cupertino, CA (US)

(73) Assignee: Seiko Epson Corporation, Tokyo (JP)

(*) Notice: Subject to any disclaimer, the term of this patent is extended or adjusted under 35 U.S.C. 154(b) by 238 days.

(21) Appl. No.: 13/099,228

(22) Filed: May 2, 2011

(65) Prior Publication Data
US 2012/0121204 A1    May 17, 2012

Related U.S. Application Data

(60) Provisional application No. 61/412,645, filed on Nov. 11, 2010.

(51) Int. Cl.
G06K 9/40 (2006.01)
G06K 15/02 (2006.01)

(52) U.S. Cl.
USPC ............................................ 382/260; 358/1.2

(58) Field of Classification Search
USPC .................. 382/100, 107, 260, 276, 293, 298, 382/305, 312, 294; 358/1.2, 3.27; 345/660, 345/629, 672
See application file for complete search history.

(56) References Cited

U.S. PATENT DOCUMENTS

| | | | |
|---|---|---|---|
| 7,574,069 B2 | 8/2009 | Setlur et al. | |
| 7,747,107 B2 | 6/2010 | Avidan et al. | |
| 7,773,099 B2 | 8/2010 | Forlines et al. | |
| 8,175,376 B2 * | 5/2012 | Marchesotti et al. | 382/159 |
| 8,249,394 B2 * | 8/2012 | Peleg et al. | 382/295 |
| 8,369,652 B1 * | 2/2013 | Khosla et al. | 382/284 |
| 8,373,802 B1 * | 2/2013 | Gross et al. | 348/700 |

OTHER PUBLICATIONS

Avidan, S., et al., "Seam Carving for Content-Aware Image Resizing", Transactions on Graphics, 2007.
Gupta, M.D., et al., "Bi-affinity filter: A bilateral type filter for color images", ECCV 2010 Workshop on Color and Reflectance in Computer Vision.
He, K., et al., "Guided Image Filtering", ECCV pp. 1-8, 2010.
Montabone, S., et al., "Human Detection Using a Mobile Platform and Novel Features Derived from a Visual Saliency Mechanism", Image and Vision Computing Jan. 9, 2010.
Rubinstein, M., et al., "A Comparative Study of Image Retargeting", ACM SIGGRAPH ASIA, 2010.
Rubinstein, M., et al., "Multi-operator Media Retargeting", TOG, 2009.
Viola, P., et al., "Robust Real-Time Face Detection", International Journal of Computer Vision, 2004.

* cited by examiner

*Primary Examiner* — Kanjibhai Patel

(57) ABSTRACT

A content-aware image retargeting technique uses an "importance filtering" technique to preserve important information in the resizing of an image. The image saliency is first filtered, guided by the image itself to achieve a structure-consistent importance map. The pixel importance is then used as the key constraint in computing the gradient map of pixel shifts from the original resolution to the target resolution. Finally the shift gradient is integrated across the image by a weighted filtering process to construct a smooth pixel shift-map and render the target image. The weight is again controlled by the pixel importance. The two filtering processes enforce the maintaining of structural consistency while preserving the important contents in the target image. The simple nature of the present filter operations allow for real-time applications and easy extension to video retargeting, as the structural constraints from the original image naturally convey the temporal coherence between frames.

21 Claims, 11 Drawing Sheets

IMPORTANCE FILTERING FOR IMAGE RETARGETING

CROSS-REFERENCE TO RELATED APPLICATION(S)

This application claims the benefit of U.S. Provisional Application No. 61/412,645 filed Nov. 11, 2010, under 35 U.S.C. §119(e) and is hereby incorporated by reference in its entirety

BACKGROUND

1. Field of Invention

The following relates to image resizing using content-aware image retargeting.

2. Description of Related Art

Due to the fast growing diversity of display devices, an image often needs to be displayed across various imaging devices having different image settings, including different aspect ratios. To assure a good viewing experience in a given display device, it may be necessary to resize, or otherwise modify, an original image for a given display device.

FIG. 1 illustrates four methods of modifying an original image 11 for display on a screen 13 that has an aspect ratio different from that of original image 11. One method of displaying original image 11 on screen 13 is to reduce the size of image 11 to fit entirely within screen 13. The shrinkage of original image 11 however degrades the viewable enjoyment of the image, particularly if screen 13 is small. Additionally, this approach does not take advantage of the entire viewable area of screen 13, as is evident by the introduction of blank spaces, i.e., black bars 2 and 4 above and below the displayed image, respectively.

Another option is to compress original image 11 to create a compressed representation 11A that matches the aspect ratio of the display screen 13. This results in a distorted image 13a being displayed. As seen, displayed image 13a experiences an elongated, stretching quality, as compared with original image 11.

A further option is to crop original image 11 to fit display screen 13 by using a cropping frame 15 whose aspect ratio matches that of display screen 13. But cropping results in a displayed image 13B that may omit important image content from original image 11. For example in the present case, in order to include the person standing off from the castle in original image 11, it is necessary to cut off half of the castle in displayed image 13B.

A more recently proposed option is termed content-aware image retargeting, and it aims to remove from view, or otherwise compress, less important image content information while preserving, or otherwise minimizing compression/distortion of, more important image content information. A simplified illustration of this idea is to divide original image 11 into a multiple image segments S1 through Sn.

In the present example, image segments S1 through Sn are shown large, wide, and vertical, but this is purely for illustration purposes. More typically, each image segment, or seam, is one pixel wide and follows a path that goes straight or shifts by one-pixel position as it crosses from one pixel row/column to the next in traversing from one side of the image to its opposite side. Preferably, each pixel in the seam's path is selected according to image content importance so that each seam defines a path of least importance as it progresses from one row/column to the next. Thus, the shifting of the seam is the result of the pixel paths identifying the pixels of least importance, i.e., pixels that are part of less important image content.

Content-aware image retargeting may automatically remove seams to reduce an image size, or insert seams to extend it, as necessary, for a given display screen. In the present simplified illustration, the resultant, displayed image 13C preserves the entire castle image content intact as well as the person standing off from the castle, but removes (or optionally compresses) the portion of original image 11 that contains less important image content information, such as the sky and field space between the person and the castle.

An objective of content-aware image retargeting is to preserve the look-and-feel (i.e., visual quality) of the original image. One method of achieving this is to maintain consistency of important structures from the original image to the resized output image (i.e., the target image). However, compression of less important image content often introduces distortion into the structure of more important content. For example, if less important content that surrounds (or is adjacent to) more important content is removed, or compressed; this may introduce curvature into the straight lines of the more important content.

Nonetheless because of its ability to preserve important imaging content, content-aware image retargeting has attracted much interest recently. A challenging issue, however, is how to balance a tradeoff between preserving important content, minimizing visual distortion, and maintaining consistency of an image structure.

It is an object of the present invention to provide an improved method of identifying important content for use in content-aware image retargeting.

Another object of the present invention is to preserve important content of an image while minimizing visual distortion and maintaining consistency of from an original image.

SUMMARY OF INVENTION

These objects are met in a filtering-based technique, hereinafter called "importance filtering". The present method first filters the image saliency of an input image, guided by the entire input image (i.e. the original image) itself, to achieve a structure-consistent importance map. The pixel importance is then used as the key constraint in computing a gradient map of pixel shifts relative to neighboring pixels. Finally the shift gradient is integrated across the image by a weighted filtering process to construct a smooth pixel shift-map and render the target image. The weight is controlled by the pixel importance. The two filtering processes enforce the maintaining of structural consistency while preserving the important contents in the target image. Furthermore, the simple nature of the present filter operations allows highly efficient implementation for real-time applications and easy extension to video retargeting, as the structural constraints from the original image naturally convey the temporal coherence between frames. The effectiveness and efficiency of the present filtering algorithm are confirmed in extensive experiments.

The above objects are thus met in a method of retargeting a digital original image to a digital target image, said method comprising: (a) accessing said original image, wherein the size of at least one dimension of said original image is different than the size of the corresponding one dimension in said target image, and a scaling factor relates the size of said one dimension of said original image to the size of said corresponding one dimension in said target image; (b) constructing an image saliency of said original image; (c) filtering the image saliency under the guidance of said original image to produce an importance map, $S^{Imp}$, that matches pixels to salient structures in said original image; (d) estimating a shift-map gradient G according to said scaling factor and under the constraint of said importance map $S^{Imp}$, wherein pixels that are matched to salient structures are assigned a consistently distributed gradient; (e) defining a shift-map M from said shift-map gradient G, wherein said shift-map M estimates pixel shifts from said original image to said target image; and (f) applying said shift-map M to said original image to construct said target image.

Preferably in step (b), said image saliency defines a saliency measure for each pixels of said original image, said saliency measure being computed from local image features within said original image according to the saliency of said features.

Further preferably in step (c), said image saliency is filtered under the guidance of the whole of said original image by using a guided filter.

Also in step (c), a face detector is incorporated into the filtering of the image saliency to identify the pixels matched to salient structures, and salient structures are determined from saliency measures in said image saliency.

Moreover in step (c): said importance map $S^{Imp}$ defines salient structures, said salient structures being important structures bet preserved in said target image; and for each defined salient structure, the pixels match to the defined salient structure constitute a group of matched pixels, and the matched pixels within each group are assigned smoothly distributed salient measures. In this case, said matched pixels within each group may be assigned substantially similar salient measures.

Also preferably in step (d), said shift-map gradient G defines each pixel's shift relative to its neighboring pixels.

Additionally in step (d), said consistently distributed gradient is substantially the same gradient value indicative of a minimal shift relative to neighboring pixels.

Preferably in step (d), said consistently distributed gradient is nonlinearly related to said scaling factor. In this case, said consistently distributed gradient is lower than a gradient linearly related to said scaling factor.

Additionally in step (d), said consistently distributed gradient is effective for maintaining distortion of said salient structure lower than distortion of unimportant regions of said original image, as defined by said importance map $S^{Imp}$.

Furthermore in step (d), said importance map $S^{Imp}$ is normalized so that $S^{Imp}(x, y) \in [0,1]$; said shift-map gradient G renders bigger gradients for pixels whose importance value as defined by said normalized importance map $S^{Imp}$ approach 0, and renders smaller gradients for pixels whose importance value as defined by said normalized importance map $S^{Imp}$ approach 1. In this approach, said shift-map gradient G is preferably non-linear and gradient values drop faster as importance values approach 1. Further preferably, gradient values drops faster when importance values are above 0.75 than when gradient values are not above 0.75.

In an embodiment of the present invention, the shift-map gradient G is defined as:

$$G(x, y) = \left[ C \cdot e^{-\left(\frac{S^{Imp}(x,y)}{\sigma}\right)^2} \right] \cdot |\alpha - 1|$$

where $\alpha$ is a scaling factor, $\sigma$ is the variance and C is a normalization term.

The shift-map gradient G may also be defined as:

$$G(x, y, \alpha) = C_1 \cdot |\alpha - 1| e^{-\alpha 2\alpha^2 \left(\frac{S^{Imp}(x,y)}{\sigma}\right)^2}$$

where $\alpha$ is a scaling factor, $\sigma$ is the variance, and $C_1$ is a normalization term.

The shift-map gradient G may further be defined as:

$$G(x, y, \alpha) = C_2 \cdot |\alpha - 1| e^{-\left(\frac{\alpha \cdot S^{Imp}(x,y)}{\sigma}\right)^2}$$

where $\alpha$ is a scaling factor, $\sigma$ is the variance, and $C_2$ is a normalization term.

If preferred, the shift-map gradient G may also be defined as:

$$G(x, y, \alpha) = C_3 \cdot |\alpha - 1| e^{-|\alpha - 1| \cdot \left(\frac{S^{Imp}(x,y)}{\sigma}\right)^2}$$

where $\alpha$ is a scaling factor, $\sigma$ is the variance, and $C_3$ is a normalization term.

Additionally in step (e), the defining of said shift-map M from said shift-map gradient G, may include integrating the shift-map gradient G by a weighted filtering process, wherein pixels matched to salient structures are weighted higher than pixels not matched to salient structures.

Further preferably, shift-map M may be defined by the following optimization:

$$M = M_{opt} = \min_{M'} |\nabla_x M' - G|$$

$$s.t. M'(0,y) = 0, M'(X,y) = |X' - X|$$

where M' is a pixel shift that when optimized renders the final shift-map M, X is dimensional coordinate of a pixel in said original image along said one dimension of the original image, X' is dimensional coordinate of the corresponding pixel in said target image along the corresponding one dimension in said target image, and x and y are coordinate in a two dimensional system including said one dimension of the original image.

Additionally, shift-map M may be defined by following relationship:

$$M(x, y) = \frac{\sum_{j=y-r}^{y+r} w(x, j)[M'(x-1, j) + G(x, j)]}{\sum_{j=y-r}^{y+r} w(x, j)}$$

where x and y are coordinate in a two dimensional system including said one dimension of the original image, r is a fraction of a dimension of the target image, and w is a weight for assuring that pixels with higher importance are affected less than pixels with lower importance.

In this case, weight w may be defined as $w(x, y) = e^{S^{Imp}(x,y)}$.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

An image records visual information of a covered scene viewed from a certain angle given predefined imaging parameters. In applying content-aware image retargeting, an original image (i.e. input image) is retargeted to different image parameters, such as a different aspect ratio, which inevitably causes the original visual content to be altered. To preserve the original image's visual quality in the retargeted image (hereinafter, the target image), the important content (hereinafter also, the important contents or important pixels) are preferably maintained close to that of the original image. Pixels that are part of less important content (hereinafter also, unimportant contents or unimportant pixels) have to endure more sacrifice. This generally changes the overall image structure and often leads to visual distortion in the target image. For example, a straight line in the original image may become badly curved in the target image if different parts of the line happen to have different importance designations. Such structural distortion often causes the target image to look much less natural than the original image. Therefore careful and proper treatment is required to minimize such distortion while preserving the important content of the original image. The balance of this tradeoff is the key and most challenging issue for content-aware retargeting.

Several approaches have been developed to address this problem. A comprehensive introduction of recent developments in this area is presented in "A Comparative Study of Image Retargeting", by Rubinstein et al, ACM SIGGRAPH ASIA, 2010, herein incorporated in its entirety by reference. Rubinstein et al. classify existing methods into two categories; discrete or continuous. Discrete methods (including seam carving and shift-maps) try to remove or copy unimportant pixels while keeping important pixels rigid. Continuous methods (including feature-aware texture mapping, scale-and-stretch, and energy-based deformation) try to compute a non-uniform warping function (from the original image to the target image) that is designed to retain the important contents and warp regions containing unimportant content. To reduce distortion on overall image structure, both categories of methods use constraints from part of the image features to optimize the retargeting manipulation with local smoothness. However, since the image features are usually computed at individual pixels or in a local patch of pixels, the global image structure can still be distorted in many cases.

In an effort to capitalize on the advantages of the different methods, Rubinstein et al. propose a multi-operator approach that optimizes a combination of several methods in "Multi-Operator Media Retargeting", by Rubinstein et al. *TOG.*, 2009. This multi-operator method greatly reduces the visual distortion on image structure, but the essential problems of its individual components (i.e. the methods that it combines) still remain.

Figure 1:
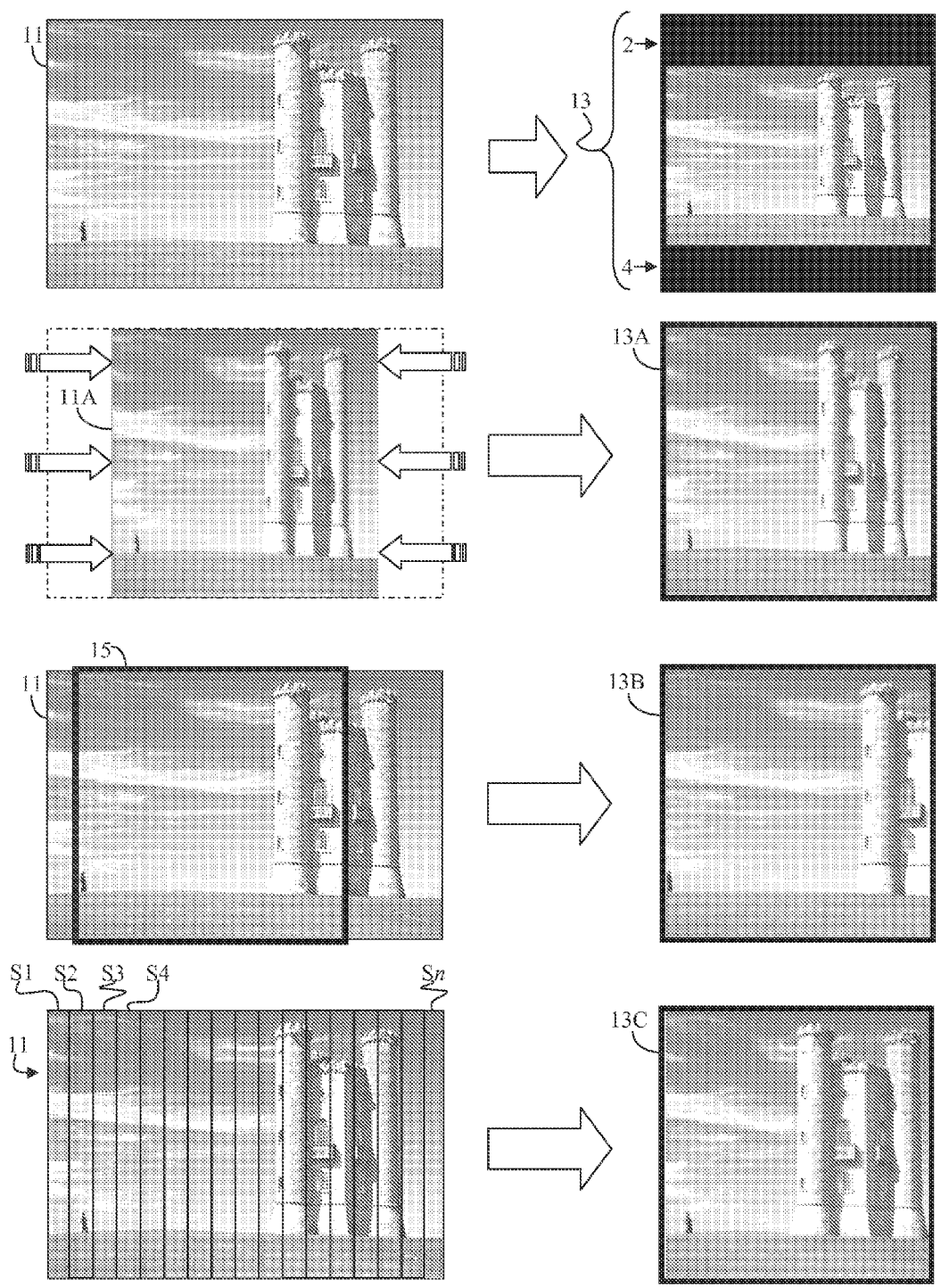
FIG. 1 illustrates four methods of modifying an original image for display on a screen that has an aspect ratio different from that the original image.
Figure 2:
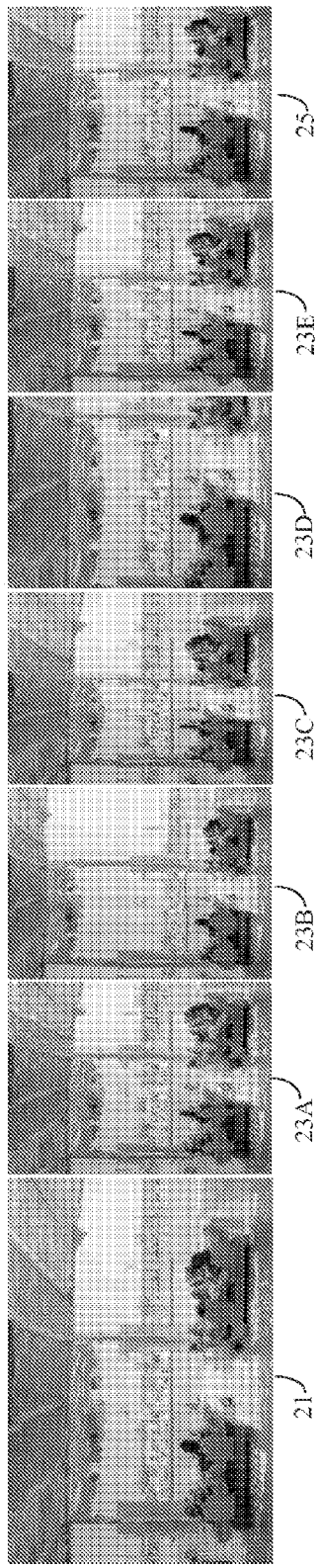
FIG. 2 compares the results of five prior art content-aware image retargeting methods with results obtained with a method in accord with present invention.

FIG. 2 compares the results of five prior art content-aware image retargeting methods, including Rubinstein's multi-operator method, with results obtained with a method in accord with present invention. An input image 21 is retargeted using: improved seam carving method resulting in target image 23A; scale-and-stretch method resulting in target image 23B; stream video method resulting in target image 23C; shift map method resulting in target image 23D; and Rubinstein et al., multi-operator method resulting in target image 23E.

The results of retargeting input image 21 using a method in accord with present invention is target image 25.

Target images 23A and 23C show distorted flags and chairs. Target images 23B and 23C exhibit an unnatural stretching quality. Target image 23D cuts off human subjects (i.e. important contents) of input image 21 and moves the roof and chairs. Target image 23E, the result of the multi-operator method, achieves better results than the other illustrated prior art methods.

But as illustrate in target image 25, the method in accord with the present invention improves over that of target image 23E by better retaining prominent areas while minimizing distortion.

Figure 3:
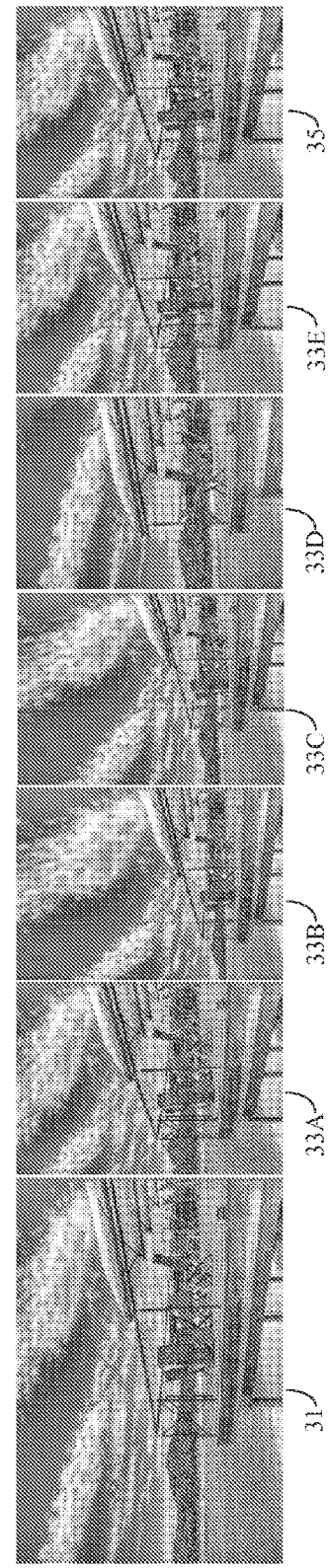
FIG. 3 shows another set of target image examples comparing the five prior art methods of FIG. 2 with the presently preferred method.

FIG. 3 shows another set of target image examples comparing the five prior art methods of FIG. 2 with the presently preferred method, as applied to another input image 31. Target images 33A, 33B, 33C, 33D, and 33E are the results of retargeting input image 31 using the improved seam carving method, the scale-and-stretch method, the stream video method, the shift map method and the multi-operator method, respectively.

Target image 35 shows the results of retargeting input image 31 using the presently preferred method in accord with the present invention. Like before, target image 35 obtained in accord with the present invention retains more of the important image content regions while minimizing visual distortion.

In the presently preferred method, to further minimize the visual distortion on image structure while preserving important contents, the retargeting process is constrained directly using the whole of the original image itself (not merely a patch) such that all the information, global and local, can be used together to enable the optimal overall quality. Based on this concept, an importance filtering algorithm for content-aware image retargeting is developed. The algorithm consists of three major steps.

In the first major step, the image saliency is computed and an importance map based on it is constructed. Preferably, the image saliency used in the present invention builds on the method illustrated in "Human Detection Using a Mobile Platform and Novel Features Derived from a Visual Saliency Mechanism" by Montabone et al., in *Image Vision Comput.*, 2010, herein incorporated in its entirety by reference. Montabone et al., image saliency technique was developed to measure visual attractiveness for use in human detection, but was not designed to be consistent with an image structure, e.g. pixels within a single pictured object can have very different saliency.

Therefore the presently preferred method defines an importance map that builds on the saliency measurements by working with the structure of salient objects in the original image. In so doing, the importance map defines image structures consistent with pictured structures in the original image, i.e., pixels that are part of same pictured object (or structure) are preferably assigned the same (or similar) importance value. Such a map is preferably achieved using guided filters, i.e., filters that filter the image saliency under the guidance of the original image. Information on guided filters can be found in "Guided Image Filtering", by He et al., *ECCV*, pages 1-8, 2010, herein incorporated in its entirety by reference.

The resulting structure-consistent importance map provides the key constraint to determine how much a pixel is allowed to shift from the original image to the target image. Ideally, neighboring pixels with similar importance should shift together so that the image structure they define will not be distorted. Additionally, important pixels (i.e., pixels having a high importance rating, i.e. they are part of important content as determined by the importance map) should not shift much with respect to neighboring pixels with similar importance ratings, such that their shape in the target image remains close to their shape in the original image. By contrast, unimportant pixels (i.e., pixels having a low importance rating or pixels that are not part of important content) should be allowed greater movement relative to neighboring pixels. Note that these constraints are mainly on the relative shift of neighboring pixels, i.e., the gradient of the pixel shift.

These criterions are addressed in the second major step of the present three-step algorithm. In the second major step, a mapping function to compute the gradient map of pixel shifts based on the importance map is developed.

The third major step of the present three-step algorithm integrates the shift-map gradients across the image to construct a smooth pixel shift-map and render the target image. Since the shift for retargeting is usually one-dimensional (horizontal or vertical), the direct integration can still be inconsistent along the other dimension. This can lead to visual distortion.

Preferably, an importance-weighted filtering method is used to address this issue. This method forces the integrated pixel shifts along both dimensions to be smooth and consistent across the image. The important pixels are weighted more so that the filtering process favors more on preserving their associated contents. The combination of the guided filters and importance-weighted filters in the presently preferred algorithm ensures the consistency of overall image structure while preserving the important contents in the target image.

The method in accord with the present invention differs significantly from prior art content-aware retargeting approaches, such as those described above in reference to FIGS. 2 and 3, in several ways. Firstly, the present invention is unique in using the original image directly to constrain the retargeting manipulation. This key feature aids in minimizing distortion on the overall image structure. Secondly, the present approach enforces the constraints from pixel importance to estimate a shift-map gradient, and then constructs a pixel shift-map from the shift-map gradient. This is unlike prior art methods where the saliency is used to compute a pixel shift-map directly. Integrating the shift-map gradients to construct the pixel shifts avoids undesired distortion such as pixel swap along the scan lines, which often occurs in direct shift mapping from saliency to pixel shift. Thirdly, both filtering operations of the present algorithm are simple and allow highly efficient implementation. Since the original image frame is directly used to guide the filtering processes, temporal coherence across frames is naturally conveyed. In addition to these efficiency advantages, the present method can be easily extended to real-time video retargeting with little additional effort.

To gauge the effectiveness of the presently preferred embodiment, the present invention was subjected to extensive experiments and comparisons based on the *RetargetMe* benchmark provided in "A Comparative Study of Image Retargeting", by M. Rubinstein, D. Gutierrez, O. Sorkine, and A. Shamir, *ACM SIGGRAPH ASIA*, 2010, herein incorporated in its entirety by reference. The results of these experiments and comparisons confirm the effectiveness and efficiency of the present importance filtering algorithm.

Before discussing the presently preferred embodiment, it may be helpful to first provide an overview of prior art methods of retargeting an input image to a target image. The following is a brief summary of currently known methods of retargeting an input image.

Many algorithms have been proposed for media retargeting across various settings such as aspect ratios. Traditionally this has been achieved by uniformly warping the contents to the target setting or cropping a single important region and discarding the rest. Though maintaining the overall structural consistency, such methods often either distort or discard partially the prominent image contents. To better present the important contents, content-aware methods have become the mainstream for media retargeting. Content-aware retargeting was pioneered by the seam carving method disclosed in "Seam Carving for Content-Aware Image Resizing" by Avidan et al. in *Transaction on Graphics*, 2007, herein incorporated in its entirety by reference.

The seam carving method, in general, resizes an input image by reducing or adding one seam at each iteration. Each seam consists of a continuous chain of the least important pixel from each row or column so that the carving operation should not alter the important contents. This method has been extended to video retargeting, and extended to allowing discontinuous seams to improve the quality of a target video.

A multi-operator approach has been proposed to optimize a combination of seam carving with cropping and uniform scaling methods. It reduces the visual distortion on image structure from individual operators and improves the target image quality.

In another approach, instead of manipulating one seam at a time, the shift-map method optimizes the cropping and blending of the important image regions to construct the target image. It thus better preserves the important image contents, though at the risk of significant change on the image structure. This method has also been extended to video retargeting.

Another category of methods try to compute a continuous warping function from the original image to the target image. The warping is non-uniform in such a way that the important contents receive little change while the un-important areas, e.g. homogeneous regions, suffer the most distortion. One method of achieving this is to apply a similarity constraint when warping user-specified important regions. Another method uses a saliency-weighted linear system to compute the non-uniform mapping for individual pixels. However, this mapping does not enforce constraints to maintain the image structure and thus can lead to visual distortion. To reduce the distortion, another method applies joint bilateral filters on pixel shifts to rectify the image structure. Still another approach proposes an energy optimization scheme to constrain the distortions. Another method divides an image into uniform grids and computes non-uniform warping that is small on important grids and big on un-important ones. The local warping functions are iteratively optimized by enforcing smoothness constraints on neighboring grids. This can reduce the distortion on the overall image structure.

Despite their differences, the existing methods generally use image saliency directly to determine important pixels to retain, and use local smoothness to restrain undesired visual distortion. Although these methods have their benefits, their resultant global image structure is generally still distorted in many occasions due to their image features being generally computed from individual pixels, or local pixel area (i.e. patches), as indicated in FIGS. 2 and 3, above.

To achieve improved results over the prior art, the present invention proposes to use the original image directly as a global constraint to guide the retargeting manipulation, which preserves prominent contents as well as minimizes the visual distortion. This method is herein termed "importance filtering."

Returning now to the method of the present invention, the preferred method resizes an original (i.e. input) image I of width X and height Y to a target image I' of resolution [X', Y']. Without loss of generality, herein an example is illustrated that focuses on a fixed height and a resizing of the width, i.e., X'≠X and Y'=Y. Extension of the present invention to other resizing combinations is considered straightforward and within the scope of one versed in the art.

Figure 4:
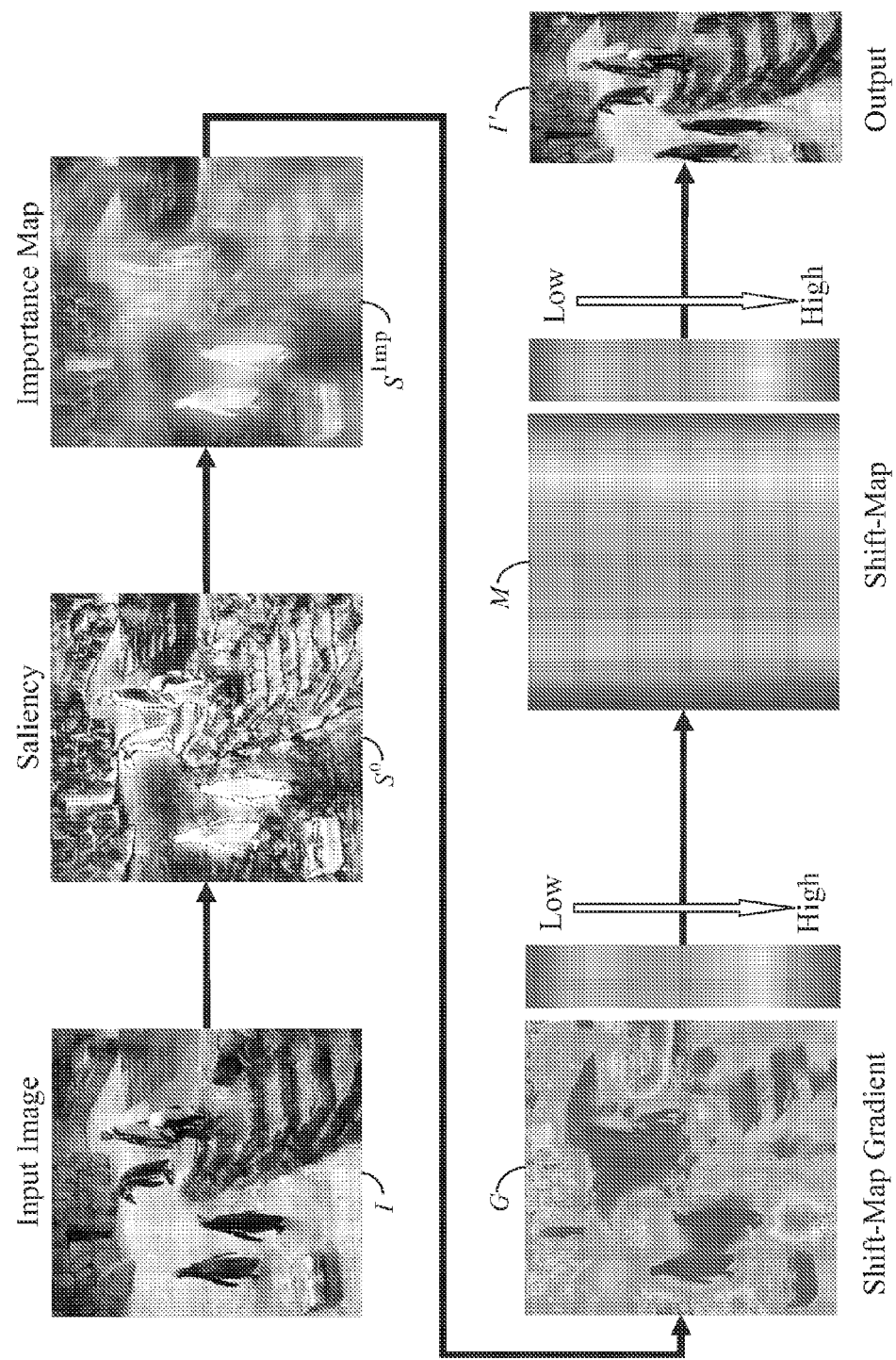
FIG. 4 illustrates the basic pipeline of the present importance filtering method in accord with the present invention.

The basic pipeline of the present importance filtering method in accord with the present invention is illustrated in FIG. 4. First, an initial image saliency $S^0$ is computed from an input image I. Initial image saliency $S^0$ is then filtered under the guidance of input image I to obtain a pixel importance map $S^{Imp}$ that assigns equal (or close in value) importance values (i.e. saliency measures) to pixels that are part of the same object, or structure, pictured within image I. A gradient field G of pixel shifts from input image I to target image I' is then estimated by applying a non-linear mapping function on pixel importance map $S^{Imp}$. Finally a pixel shift-map M is computed by integrating the gradient field G (i.e. shift-map gradient G) using an importance-weighted filtering algorithm, and the target image I' is rendered. Each of these stages is discussed in more detail below.

Initial image saliency $S^0$ may be a standard saliency measure, which is usually computed from local image features within input image I to obtain a measure the significance (or saliency) of pixels. Various known saliency measurement methods may be used to obtain initial image saliency $S^0$. Examples of such known saliency measurement methods are the gradient magnitudes method, neighborhood discontinuity method, and patch based visual attention method; all of which have achieved some level of success in image retargeting.

However, use of a standard image saliency measure directly in a retargeting operation is not considered sufficient for achieving the objects of the present invention. Instead, the present invention combines techniques from face detection with the initial saliency measurement $S^0$ (preferably generated by means of a visual attention saliency measurement method) to achieved the pixel importance map $S^{Imp}$. That is, the presently preferred embodiment combines a visual attention saliency measure method (such as disclosed in "Human detection using a mobile platform and novel features derived from a visual saliency mechanism" by Montabone et al., *Image Vision Comput.*, 2010, herein incorporated in its entirety by reference) with a face detector (such as the face detector disclosed in "Robust real-time face detection" by Viola et al., *Int. J. Comput. Vision*, 2004, herein incorporated in its entirety by reference) to compute an importance map $S^{Imp}$ (i.e. an image saliency that is more robust and consistent across image structures) of the input image I.

Thus, importance map $S^{Imp}$ builds on an initial image saliency measure $S^0$. For example in FIG. 5, an initial image saliency $S_2^0$, which is a saliency map computed from input image $I_2$, effectively captures the visual attractiveness of local regions. However image saliency $S_2^0$ is not designed to be consistent within geometric structures of an image (i.e. it is not consistent across pixel distributions that define objects or structures pictured within an input image). That is, saliency may vary significantly within a pictured object causing some parts of the same object to be deemed more salient than others. This can lead to distortion of the object in the target image. For example in saliency map $S_2^0$, the saliency along the leg structure of the pictured woman varies considerably, as indicated by the large difference between high and low intensity values. If one were to retarget input image $I_2$ using saliency map $S_2^0$ to preserve important content while compressing (i.e. distorting) unimportant content, the legs would suffer substantial distortion since some parts of the leg structure would undergo greater compression than others.

A goal of the presently preferred content-aware retargeting method is not only to preserve important contents, but also to minimize distortions on pictured objects/structures. To achieve this, the pixels on the same object (i.e. pixels that are part a common pictured object or structure) should shift in nearly the same way. Since the amount of permissible pixel shift is determined by its importance, or saliency, the importance of all pixels that define the same pictured object should be close to each other (or substantially the same).

The above described prior art saliency measurement methods, including that of Montabone et al., are insufficient for achieving this objective. The presently preferred embodiment therefore defines an importance map that matches pixels to (salient) specific objects, or image structures, (i.e. collects pixels into groups that defined common pictured objects).

To construct an importance map $S^{Imp}$ that matches image structures (i.e. recognizes salient image structures and identifies the pixels that comprise them), the presently preferred embodiment uses a guided filtering method, such as described in "Guided image filtering" by He et al., *ECCV*, pages 1-8, 2010, herein incorporated in its entirety by reference. Use of the guided filtering method enhances the saliency under the guidance of the original image. It is to be understood that selection of an appropriate guided filtering method is considered a design choice, and other guided filtering methods may be used, such as that described in "Bi-affinity filter: A bilateral type filter for color images" by Gupta et al., *ECCV 2010 Workshop on Color and Reflectance in Computer Vision*, 2010.

Preferably, the guided filtering method considers the target image as a linear transform of the guidance to constrain the smoothing process. The target image thus nicely resembles the structure of the guidance after filtering. The result of this approach is an importance map, or importance image, such as $S_2^{Imp}$ shown in FIG. 5. That is, importance map $S_2^{Imp}$ is the result of guided filtering initial saliency map $S_2^0$ under the guidance of input image $I_2$. As is evident from a comparison of initial saliency map $S_2^0$ and importance map $S_2^{Imp}$, the importance rating of pixels within a common pictured object (i.e., of pixels that are part of the same pictured object or structure, i.e. the pictured woman in the present example) is more consistent, which means that the image structure is better retained, or maintained, in the target image.

The last two stages in the process flow of FIG. 4 are the shift-map gradient G (indicating a pixel's shift relative to its neighboring pixels) and the shift-map M (indicating pixel shifts from an input image to a target image). As an illustration, FIG. 6 shows two different shift-map gradients $G_2''$ and $G_2$, and their corresponding pixel shift-maps $M_2''$ and $M_2$, as produced in two respective possible process flow paths P1 and P2 in the retargeting of input image $I_2$ of FIG. 5. Path P1 retargets input image $I_2$ using the prior art method of uniform scaling (i.e. uniform scaling along the x-dimension to adjust the aspect ratio) to create to a first target image $I_2''$. Path P2 retargets input image $I_2$ using importance map $S_2^{Imp}$ of FIG. 5, in accord with the present invention, to create target image $I_2'$.

In general, the retargeting of an input image is achieved basically by shifting the pixel coordinates and/or warping their colors from the input image to the target image, such as indicated by a shift-map. For example, a pixel (x, y) from an input image may be retargeted to a target pixel (x', y) in a target image with a shift along the x-dimension defined as $M(x, y)=x'-x$. Such pixel shifts across an input image form shift-map. The positive or negative sign of the shift value indicates the shift direction and/or indicates shrinking or enlarging. The magnitude (i.e. absolute value) of the shift value indicates the amount of shifting. As is shown in FIG. 4, in the presently preferred embodiment, a shift-map M is defined from the shift-map gradient G.

In the case of uniform scaling, as illustrated by path P1 in FIG. 6, the shift-map gradient $G_2''$ is uniform. Uniform scaling results in absolute shift-map $M_2''$.

Figure 5:
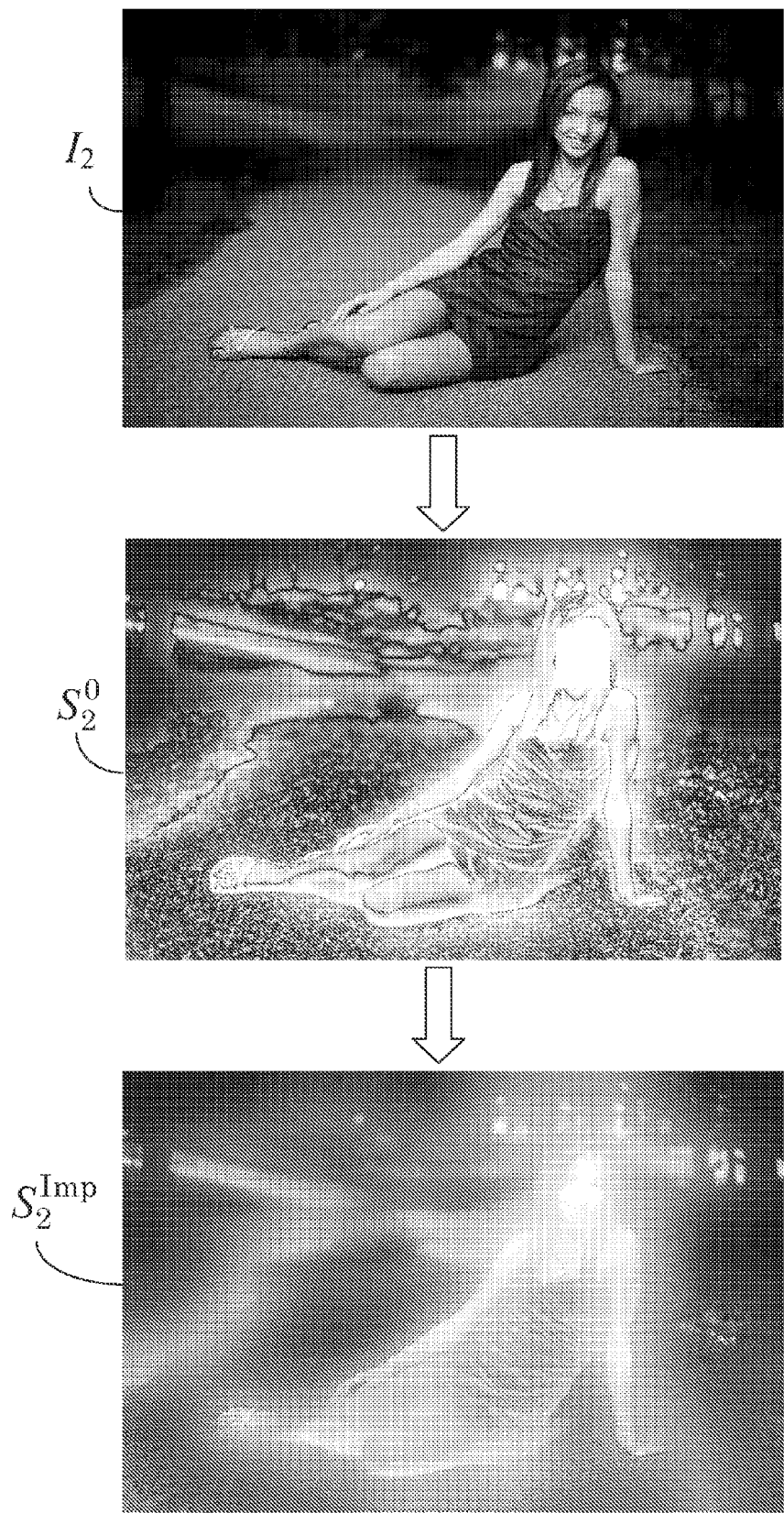
FIG. 5 illustrates an initial image saliency derived from an input image, and an importance map derived from the initial image saliency.
Figure 6:
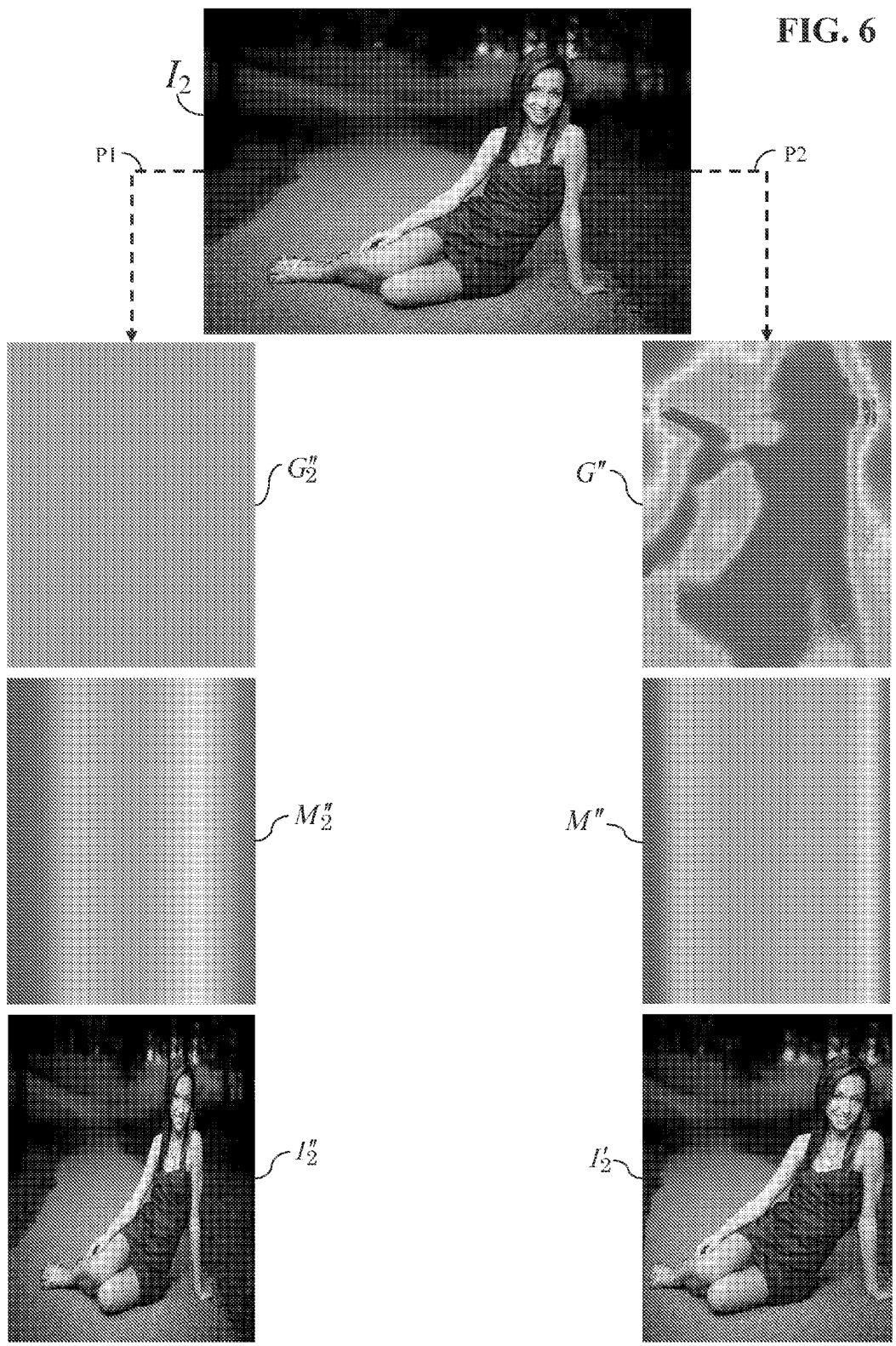
FIG. 6 illustrates for paths for constructing a target image, a first path using uniform scaling and a second path using importance map of FIG. 5 to define a non-linear shift-map gradient.

By contrast as illustrated by path P2, the shift-map gradient $G_2$ resulting from using importance map $S_2^{Imp}$ of FIG. 5 is non-uniform. Shift-map gradient $G_2$ places the lowest pixel shifts in the region of the pictured woman, as indicated by lower intensity values (i.e. darker regions in shift-map gradient $G_2$). Using the presently preferred importance filtering method, shift-map gradient $G_2$ results in absolute shift-map $M_2$.

As shown, the absolute shift values generally increase monotonically with respect to the x-dimension. However, it is also desirable that the shift-map M be smooth along the y-dimension to avoid distortion. A discussion of how the y-dimension may be made smooth is provided below.

An importance map (such as $S_2^{Imp}$ of FIG. 5) provides the key constraint to create a shift-map in accord with the present invention (such as shift-map $M_2$ of FIG. 6). Ideally, neighboring pixels with similar importance should shift together as a group to maintain their structure. To retain the shapes of prominent objects in the target image close to those of the original input image, pixels with high importance should not shift much relative to their neighbors with similar importance. On the other hand, pixels with low importance should contribute more on the overall pixel shift across the target image.

Clearly these constraints are mainly on the relative shift of neighboring pixels, which is the gradient of the shift-map, or shift-map gradient G. Constant shift gradients refer to a uniform scaling of the local neighborhood. A zero gradient means a rigid translation of the associated area, and a big gradient corresponds to a large deformation. For ease of illustration, the shift gradient is defined along the width dimension (i.e. the x-dimension), as $$G(x,y) = \nabla_x M(x,y) \quad (1)$$

As explained above, shift-map gradient field $G_2''$ of path P1 is defined using uniform scaling, and shift-map gradient field $G_2$ of path P2 is defined using importance filtering in accord with the present invention. As expected, uniform scaling leads to constant gradients while importance filtering results in greatly varying gradients.

Comparing the original input image $I_2$ with shift-map gradient $G_2$, it can be seen that that the region of the pictured woman is dark (i.e. has low gradient values) and demonstrates a nearly constant gradient so as to maintain that region of input image $I_2$ nearly rigid in the target image (i.e. very little change from the original image to the target image). By contrast, the background area surrounding the region of the pictured woman has a largely varying gradient to allow more severe deformation. This is a desired result.

As is discussed above, a desired shift-map gradient field G is constructed using an importance filtering algorithm based on the importance map. A discussion of this shift-map, gradient mapping function G follows.

The shift-map gradient G is estimated based on the corresponding pixel importance using a non-linear mapping function. Preferably, the importance is normalized such that $S_2^{Imp}(x, y) \in [0,1]$. It is desirable that the gradient mapping function render bigger gradients (i.e. bigger pixel shifts relative to neighboring pixels) when pixel importance is closer to 0, and render smaller gradients (i.e. smaller pixel shifts relative to neighboring pixels) when pixel importance is closer to 1. Thus, the shift-map gradient G should be non-linear so that gradient values drop faster as importance values gets closer to 1. Preferably, gradient values drop faster when normalized importance values are above 0.75.

The next step is to define a gradient mapping function (i.e. a shift-map gradient G) that has these characteristics. An intuitive choice for such a function is the zero-mean Gaussian function, such that the shift-map gradient G may be defined as:

$$G(x, y) = l \cdot e^{-\left(\frac{S^{Imp}(x,y)}{\sigma}\right)^2} \quad (2)$$

where $\alpha$ is the variance and l is the normalization term. A typical value for $\sigma$ is 0.5.

From Eqn. (1), the integral of shift gradients in a row equals the total pixel shift from the original width X to the target width X', i.e., $|X'-X|=\Sigma_{x=0}^{X-1}(x, y)$. Thus, normalizing term l can be computed as, $$l = \frac{|X'-X|}{\sum_{x=0}^{X-1} e^{-\left(\frac{S^{Imp}(x,y)}{\sigma}\right)^2}} = C \cdot |\alpha - 1| \quad (3)$$

where $$C = \frac{X}{\sum_{x=0}^{X-1} e^{-\left(\frac{S^{Imp}(x,y)}{\sigma}\right)^2}}, \alpha = X'/X \quad (4)$$

and $\alpha$ is the scaling factor.

Incorporating Eqn. (3) into Eqn. (2) simplifies the shift-map gradient function G to:

$$G(x, y) = \left[C \cdot e^{-\left(\frac{S^{Imp}(x,y)}{\sigma}\right)^2}\right] \cdot |\alpha - 1|$$

This indicates that the shift gradient G may be uniformly scaled by $|\alpha-1|$.

Figure 7:
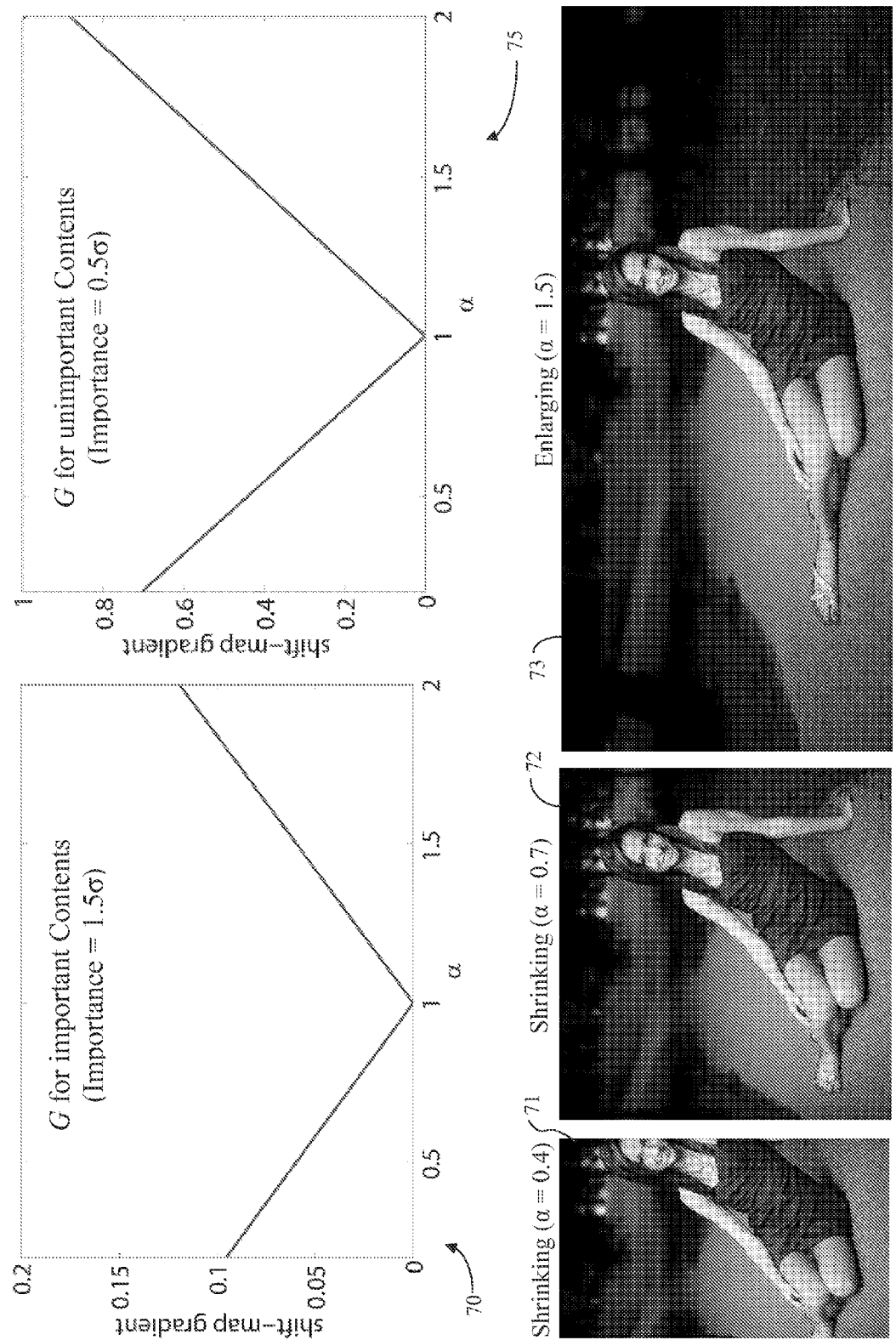
FIG. 7 illustrates the performance of one embodiment of the present invention.

With reference to FIG. 7, two examples of how a shift-map gradient of a given pixel changes informally with changing α are shown. The first mapping function 70 indicates how the shift-map gradient G varies with changing a for important content, which in the present example is defined as having an importance value of one-and-half times the variance σ. The second mapping function 75 indicates how the shift-map gradient G varies with changing α for unimportant content, which in the present example is defined as having an importance value of half the variance σ. As is explained above, the shift-map gradient is an indication of the amount of change (i.e. distortion) between neighboring pixels in the target image. For example, a larger value of shift-map gradient for a given pixel indicates a larger distortion for that pixel, and a smaller value of shift-map gradient indicates a smaller distortion. A gradient of 0 would indicate no distortion, i.e. direct copying of a pixel from the input image to the target image.

As an illustration, the results of applying the shift-map gradient G of Eqn. 2 to input image $I_2$ using importance map $S_2^{Imp}$ of FIG. 5 are shown in FIG. 7. When α=1 (indicating no scaling between the input image and the target image, i.e. direct pixel copying from the input image to the target image), both the shift-map gradient for important content 70 and the shift-map gradient for unimportant content 75 are zero indicating no distortion. When α>1 (indicating enlargement of the input image to the target image, i.e. increasing the x-dimension of the input image to create the target image) the shift-map gradients for both important and unimportant contents increase linearly with increasing α. This is not an issue for unimportant content since one expects such content to be distorted to accommodate the dimensional specifications of the target image, but it is an issue for prominent areas since it introduces increasing distortion even to the important contents. Thus, distortion to important contents becomes more noticeable, as shown in enlarged target image 73.

On the other hand, when α<1 (indicating a reduction of the input image to the target image, i.e. decreasing the x-dimension of the input image to create the target image) the shift-map gradient for the less-important pixels (shift-map gradient 75) increases linearly with decreasing α. A problem arises because unimportant pixels may be intersperse within important contents or may be adjoining important contents. Since the shrinking operation basically squeezes or even removes less-important pixels, the up-scaled shift-map gradient leads to more severe cutting (i.e. removing) of less-important pixels. Unfortunately, some of the less-important pixels that are cut may be within important contents, as shown in target image 72 where α=0.7 and target image 71 where α=0.4. As is particularly evident from target image 71, because of the severe cutting within unimportant areas adjoining important content comprised of the pictured woman, right and left portions of the pictured woman is cut-off.

It would therefore be desirable for a shift-map gradient to respond differently to changes in a for important content when α>1 (i.e. when the input image is being enlarged) than the linear response shown in shift-map gradient 70. It would also be desirable for a shift-map gradient to respond differently to changes in a for unimportant content when α<1 (i.e. when the input image is being reduced) than the linear response shown in shift-map gradient 75.

Specifically for important content, when α is greater than 1, increases in the shift-map gradient with increasing a should be limited since the important content from the input image would full fit with minimal modification within the target image's enlarged aspect ratio. Similarly for unimportant content, when α is less than 1, increases in the shift-map gradient with decreasing α should be reduced to avoid severe distortion along areas of important content that adjoins unimportant content.

That is, to avoid the above-described distortion, the shift map gradient function should be designed in such a way that, when α>1, the shift-map gradient for an important pixel starts to drop quickly with increasing α. Additionally when α<1, the growth with decreasing α, of the shift-map gradient for a less-important pixel should be slower than the linear growth provided by Eqn. (2). In this way, both the undesired deformation that comes with image enlargement and the undesired cutting of prominent areas that comes with image reductions can be reduced. Accordingly alternate designs for the shift-map gradient function are now presented, as follows:

$$G(x, y, \alpha) = C_1 \cdot |\alpha - 1| e^{-\alpha^{2\alpha^2} \cdot \left(\frac{S^{Imp}(x,y)}{\sigma}\right)^2} \quad (5)$$

$$G(x, y, \alpha) = C_2 \cdot |\alpha - 1| e^{-\left(\frac{\alpha \cdot S^{Imp}(x,y)}{\sigma}\right)^2} \quad (6)$$

$$G(x, y, \alpha) = C_3 \cdot |\alpha - 1| e^{-|\alpha-1| \cdot \left(\frac{S^{Imp}(x,y)}{\sigma}\right)^2} \quad (7)$$

where the normalization terms are obtained analogously to the computation of the normalization terms in Eqns. (3) and (4), above.

Figure 8A:
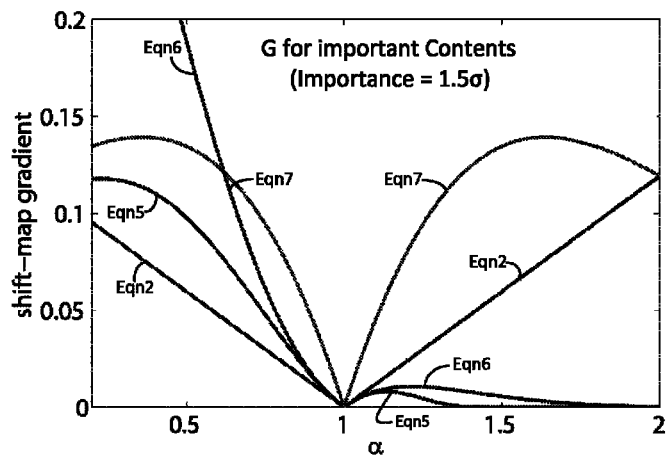
FIGS. 8A and 8B compare four formulations of a shift-map gradient function in accord with the present invention.
Figure 8B:
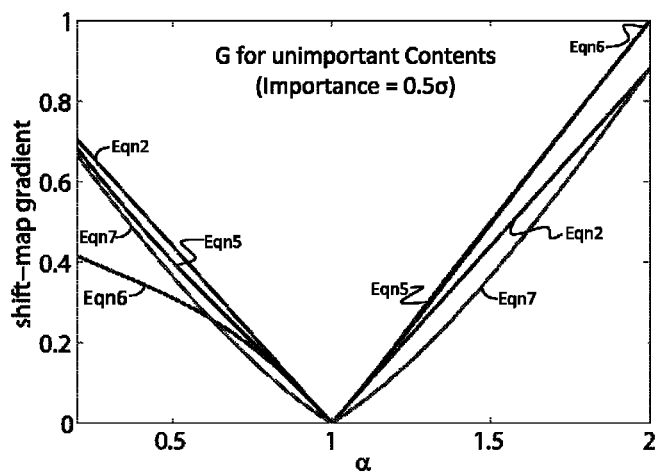

FIG. 8A compares shift-map gradient functions for important content as determined from Eqns. (5), (6), and (7) with the shift-map gradient function of Eqn. (2), as shown in FIG. 7. FIG. 8B compares the shift-map gradient functions for unimportant content from Eqns. (5), (6), and (7) with the shift-map gradient function of Eqn. (2), as shown in FIG. 7.

As shown, the shift-map gradient functions of Eqns. (5), (6), and (7) satisfy the above-specified desired effect, but each may serve better for different cases. For important content, when α>1, as shown in FIG. 8A, the gradient values of important pixels drop to below those of Eqn. (2) before α reaches a value of 2. Among the gradient functions shown in FIG. 8A, for α>1, Eqn. (5) drops off the fastest and Eqn. (7) drops off the slowest. The gradient values defined by Eqn. (2) are always greater than the gradient values provided be either of Eqns. (5) or (6), but smaller than the gradient values provided by Eqn. (7) as long as α<2. Since Eqn. (5) achieves the lowest gradient values during enlargement of an input image (i.e. for α>1), Eqn. (5) retains important contents the best. It is also noted that Eqn. (6) works better than Eqns. (2) or (7). Additionally, Eqn. (7) allows the most stretching (i.e. distortion) of prominent objects when α is between 1 and 2.

For unimportant content, during reduction of an input image (i.e. when α<1) the gradient values of less-important pixels for all of Eqns. (5), (6) and (7) are always lower than those provided by Eqn. (2). As a result, all three Eqns. (5), (6) and (7) achieve less cutting off of prominent areas than Eqn. (2).

Among Eqns. (5), (6) and (7), Eqn. (5) provides the largest gradient values and thus permits the most cutting-off of prominent areas. Eqn. (6) provides higher values than Eqn. (7) for α>0.6, but lower gradient values than Eqn. (7) for α<0.6. Thus for image reduction, Eqn. (7) leads to the least cutting off of prominent areas when α>0.6 and Eqn. (6) leads to the least cutting off of prominent areas when α<0.6.

Figure 9:
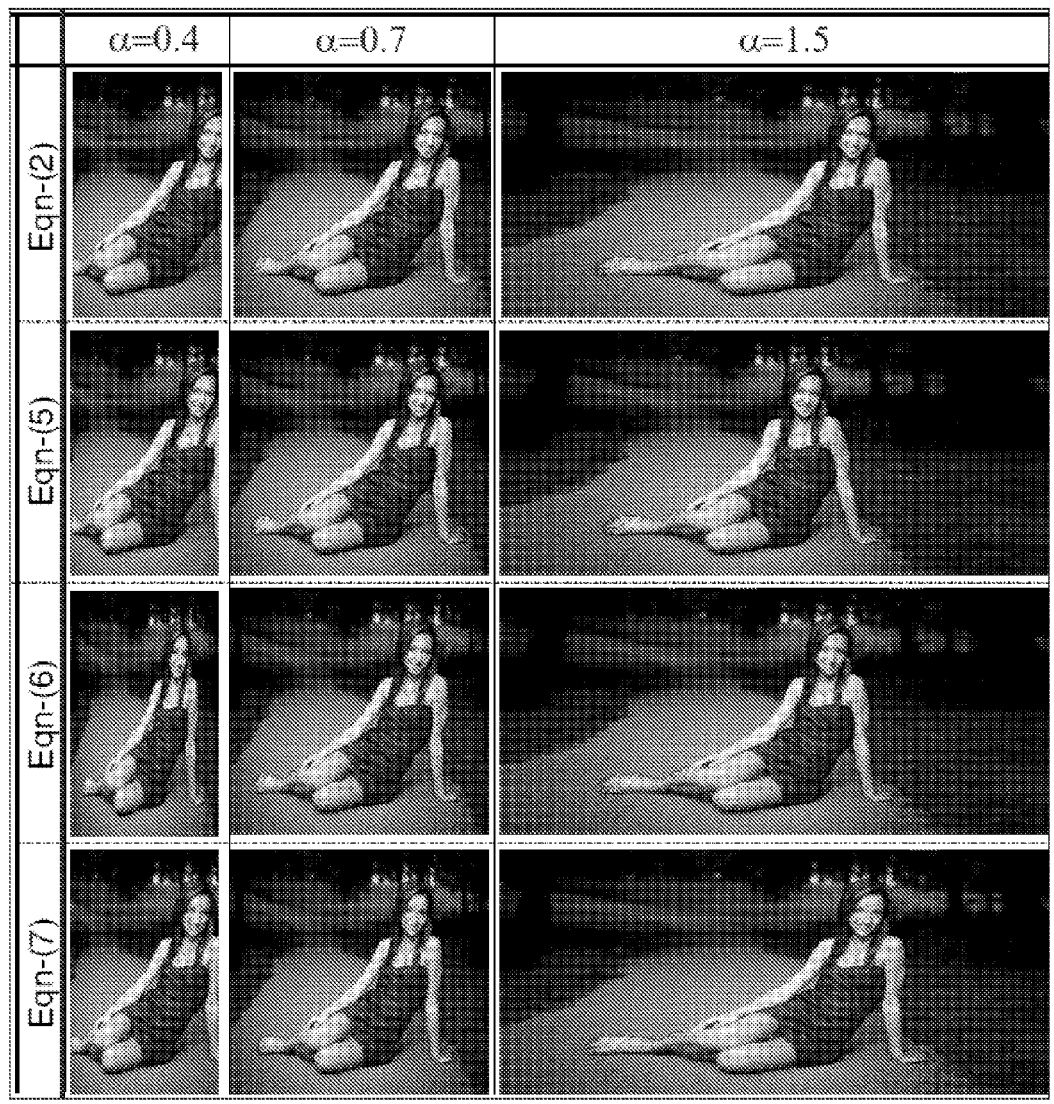
FIG. 9 compares the performance of the four shift-map gradient functions of FIG. 8.

For illustration purposes, a comparison of three sets of target images with α set to 0.4, 0.7 and 1.5, and created using the shift-map gradient fields of Eqns. (2), (5), (6) and (7), are shown in FIG. 9.

These shift-map gradient functions can be easily combined into one function with more stable or better overall performance. However, they are herein discussed individually for ease of explanation, and it is left as a design choice to determine the best one (or best combination of) function(s) for a given specific need. For example, selection of a specific shift-map gradient function may depend on whether an input image is being enlarged (i.e. $\alpha>1$) and whether one wishes to maintain important content with least change. Selection may also depend on whether an input image is being reduced (i.e., $\alpha<1$), on the amount of reduction (i.e. the scaling value of $\alpha$), and on whether one wishes to reducing the potential cutting off of prominent areas.

For ease of explanation, unless otherwise stated, the provided examples herein, assume the use of Eqn. (5) for construction of shift-map gradient function G. For example, shift-map gradient field $G_2$ in FIG. 6 is produced using Eqn. (5), where $\alpha=0.5$.

This leads to the topic of gradient integration of importance-weighted filtering.

Once the shift-map gradients G are constructed, one can integrate them to estimate the pixel shift-map M and render the target image I', as illustrated in FIG. 4. A straightforward solution to the integral is to optimize the objective as follows, $$M = M_{opt} = \min_{M'} |\nabla_x M' - G|$$

$$s.t. M'(0,y) = 0, M'(X,y) = |X'-X| \qquad (8)$$

where M' is a pixel shift that when optimized renders the final shift-map M. Such an optimization process is often computationally expensive. Furthermore, since the pixel shift is only one-dimensional, integration along individual rows may still be inconsistent with each other. This inconsistency will cause undesired visual distortion in the target image.

Figure 10:
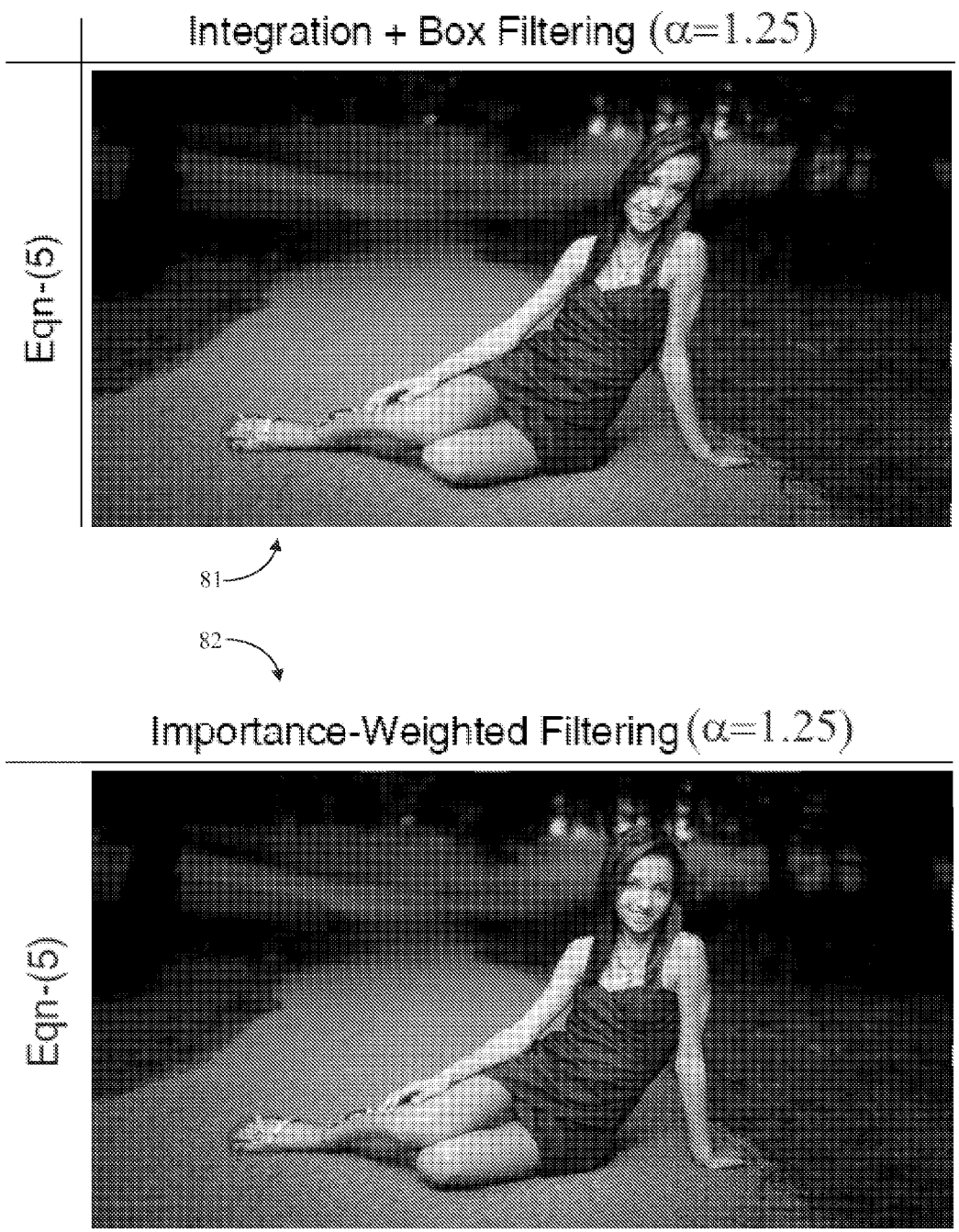
FIG. 10 compares the performance of importance-weighted filtering for determining a shift-map with the performance of using integration+box filtering.

One straight-forward solution to this problem is direct gradient integration followed by shift-map smoothing using box filters. However smoothing the shift-map directly has disadvantages. First, it often leads to artifacts such as blurriness, holes, and pixel swaps, especially across object borders. Second and more importantly, smoothing by box filters may not be able to rectify shift inconsistency across the image. Since this inconsistency is accumulated over the columns during integration, it can be big everywhere in later parts of an image. Additionally, since box filters smooth pixel shifts in only small local neighborhoods, it is unlikely that they can restore global consistency to the target image. An example of an enlarged target image created using this straight-forward approach of direct gradient integration followed by shift-map smoothing using box filters is target image 81 in FIG. 10.

A better solution to the optimization problem of Eqn. (8) is an efficient algorithm that incorporates importance-weighted filtering into the integration process. It has been found that this preferred solution better retains consistency across the target image. Specifically, at each step one pixel in each row is integrated at the present column. The shift integral at this pixel equals its gradient plus an importance-weighted average of the pixel shifts in a large neighborhood within the previous column. The formulation for this preferred solution is, $$M(x, y) = \frac{\sum_{j=y-r}^{y+r} w(x, j)[M'(x-1, j) + G(x, j)]}{\sum_{j=y-r}^{y+r} w(x, j)} \qquad (9)$$

It defines a one-dimensional column filter of size (2r+1). The typical choice for r is a quarter of the image height. The high efficiency of a one-dimensional filter allows such a large kernel size, and averaging over a large neighborhood enables the integrated shift-map to be smooth and consistent in both dimensions (i.e. in both the x and y directions). The weight w is designed in such a way that the averaging filter does not affect the important pixels as much as the unimportant ones. In another words, in the filtering process the shift from the important pixels should contribute more (i.e. have a higher weight) so that their shape will not be distorted by the nearby unimportant pixels. Hence, the weight w is defined based on the pixel importance as follows, $$w(x,y) = e^{S^{Imp}(x,y)} \qquad (10)$$

As an example, shift-map $M_2$ in FIG. 6 is integrated from shift-map gradient field $G_2$ according to the present method, where $\alpha=0.5$. As expected, shift-map $M_2$ shows smooth and consistent pixel shifts.

The target image can then be easily warped based on the pixel shifts defined by the thus constructed pixel shift-map M. For comparison purposes, an enlarged target image created using the present method of gradient integration of importance-weighted filtering is illustrated in target image 82 of FIG. 10. As shown, enlarged target image 82 preserves the prominent contents (i.e. the pictured woman), while retaining the overall structural consistency (i.e. the relationship among pictured objects) of input image $I_2$ of FIG. 5.

The above-described system and method was tested on various input images in a PC with Duo CPU 2.53 GHz. Without code optimization, it takes less than 80 ms for retargeting an input image of 1024×768, without the need of down-sampling. The present system is flexible enough to provide both fully automatic solution and interactive ways for users to select areas of an input image to preserve. However, all results shown herein were achieved by the automatic solution.

Figure 11:
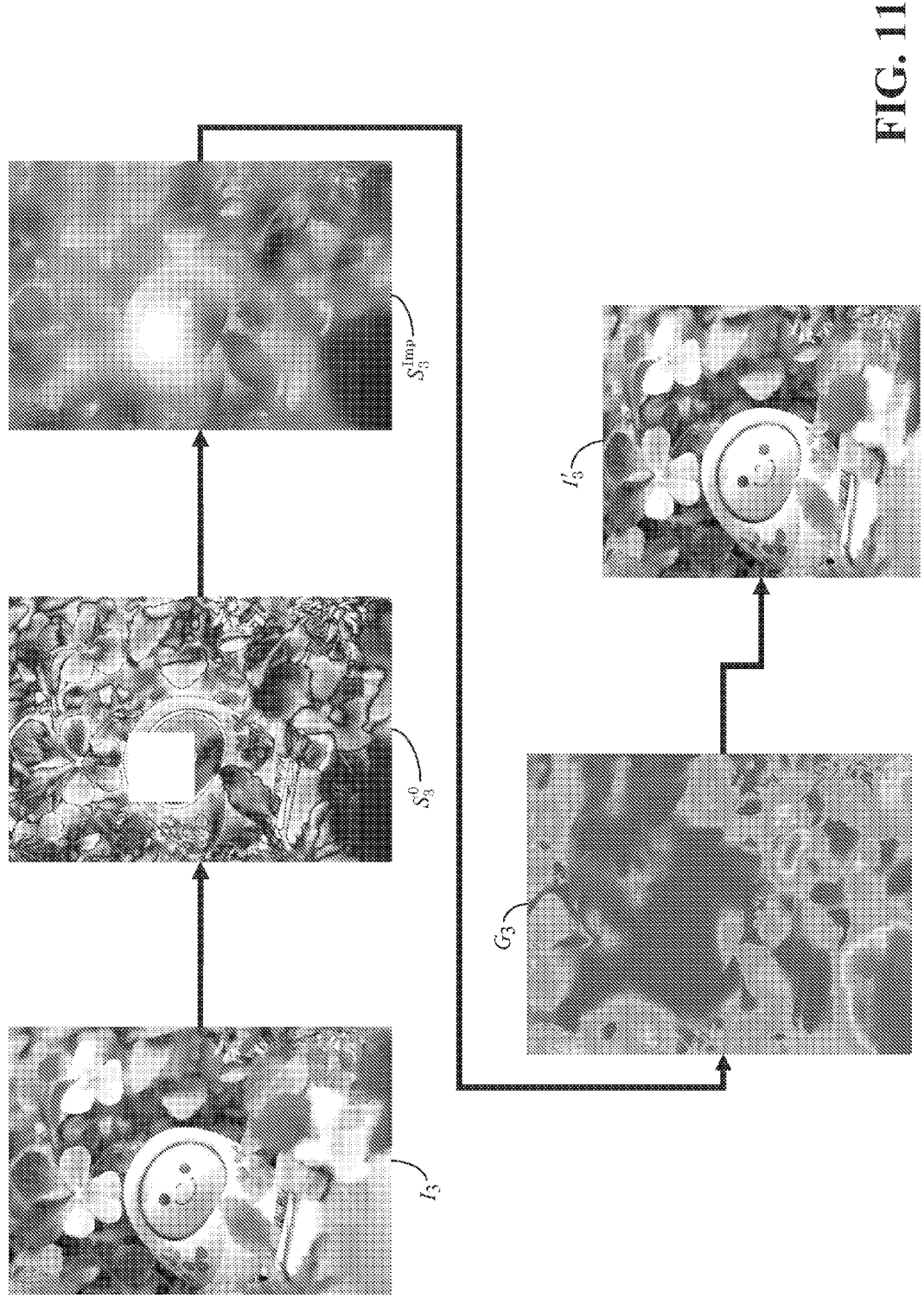
FIG. 11 is another example of a process flow in accord with the present invention.

FIG. 11 shows another example of the pipeline (i.e. process flow or method) of the present invention as applied to another input image $I_3$, where input image $I_3$ is reduced (with $\alpha=0.75$) in the y-dimension to achieve target image $I_3'$. The intervening stages of producing an initial image saliency $S_3^0$, followed by an importance map $S_3^{Imp}$, and a shift-map gradient $G_3$ are also shown. Although not shown, it is to be understood that a step of creating a shift-map using the present importance filtering algorithm lies between shift-map gradient $G_3$ and target image $I_3'$.

As shown, the important contents of input image $I_3$ are well preserved without distortion in target image $I_3'$. Additionally, the overall image structure of input image $I_3$ is also preserved in target image $I_3'$.

The presently preferred method was compared with state-of-art methods in the reduction of an input image by half along the x-dimension ($\alpha=0.5$). Target images created using each method are shown in FIG. 12.

Figure 12:
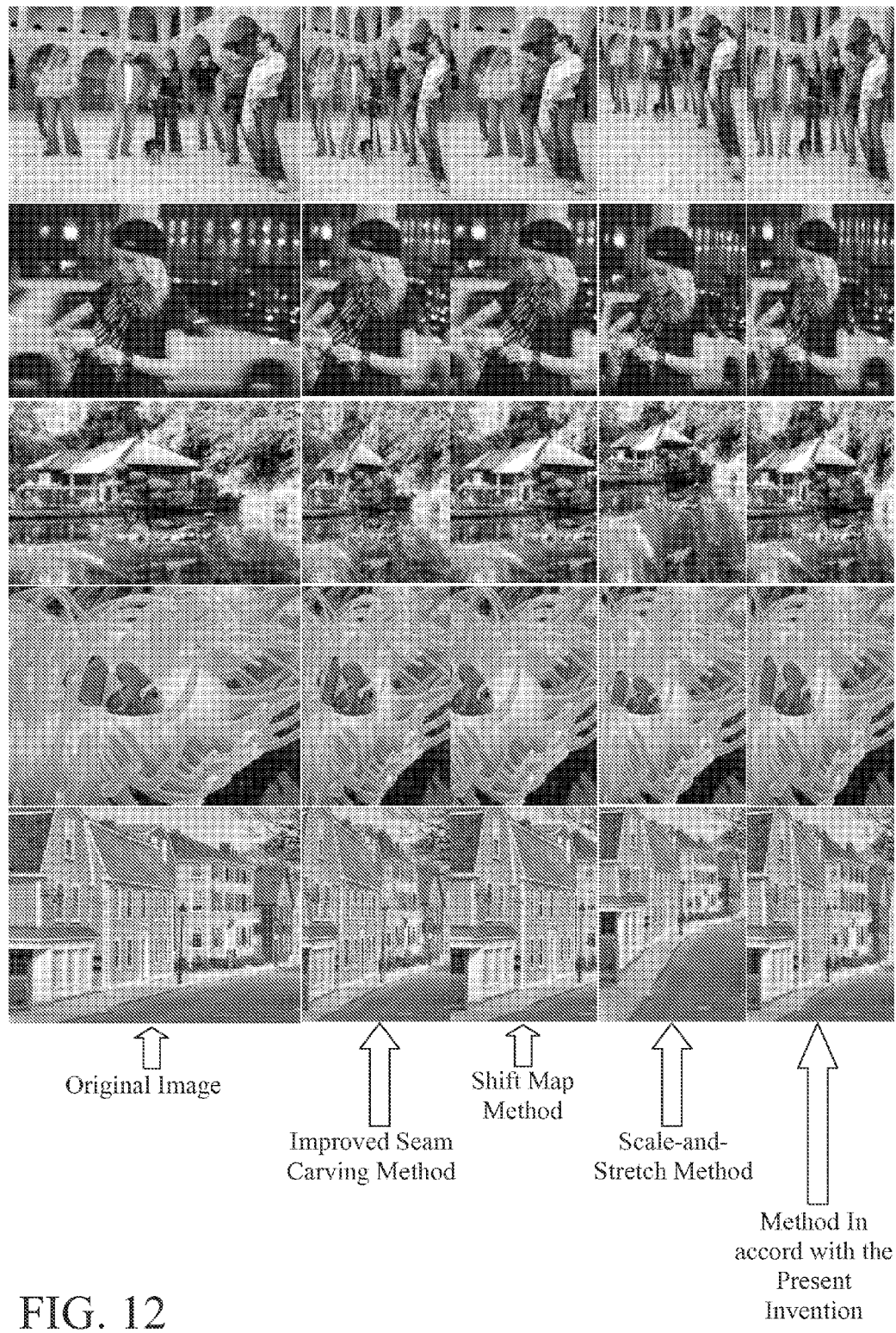
FIG. 12 compares the target images created in accord with the present invention with target images created using three prior art methods.

Thus, FIG. 12 shows the results of retargeting an original image by the improved seam carving method, the shift map method, the scale-and-stretch method, and the presently preferred method in accord with the present invention.

As shown, the presently preferred method achieves the best overall balance between retaining the prominent contents and minimizing the distortion on pictured structures. The other methods generally work well but lead to occasional noticeable artifacts.

When using the improved seam carving method, abrupt distortions occur on the human bodies in the first row and the house shapes in the third and fifth rows of FIG. 12.

The Shift map method produces smooth and natural images after resizing, but it results in severe cutting off of important contents in almost in all the provided examples.

The Shift map method can also alter the pictured structures significantly, such as exhibited by the shoulder of the girl in the second row of FIG. 12.

The scale-and-stretch method avoids abrupt distortions and achieves smooth image structure, but important contents, such as the humans in the first two rows, the house shadow in the third row, and the street and sidewalk in the fifth row are stretched or squeezed unnaturally.

In many cases, images resized by these methods, especially those resized by the scale-and-stretch method and the shift map method, may by themselves look quite realistic. But when placed together with the original image, significant changes on image structure or prominent contents can be observed. The presently preferred method tends to minimize such changes.

Among the existing works, the multi-operator method (examples of which are shown in FIGS. 2 and 3) yields the most similar results to the present invention. A slight difference in output target images is that the presently preferred method favors more the preserving the important contents and allows more deformation of unimportant background areas.

As shown in FIG. 4, an important step in the presently preferred method is image saliency estimation. This is a difficult problem by itself, and none of the available saliency measurement techniques can guarantee a perfect estimation. In cases where the visual attention-based saliency measurement technique fails to locate a prominent area, the presently preferred method may result in undesired distortion in that area. For example, in the first row of FIG. 12 the left leg of the second man from the left is given a very low saliency. The present method thus shrinks it more than the right leg and leads to an unnatural local area in the resized target image. A more reliable saliency measurement can further improve the performance of the present method.

The present method directly warps the image pixels based on the integrated shift-map to render the final target image. In case the unimportant areas are squeezed very much, the direct mapping may result in artifacts like discontinuity in the resized image. For example, in the second row of FIG. 12, the right top of the image is squeezed significantly and appears divided by a couple of vertical lines. One solution may be to warp the color gradient of the resized image and then integrate the gradient to construct the target image, using gradient-domain compositing methods such as Poisson blending. This way a smooth color image can be achieved.

The present method can be extended to content-aware video retargeting in a straight-forward manner, by basically frame-by-frame application of the present image resizing method. A small difference is that a motion feature, motion energy image (MEI), is added to the saliency cues, as it would be understood by those versed in the art. For each frame, the MEI is computed using a neighborhood of 20 frames and directly added to its image saliency to construct the combined saliency. The rest of the process is exactly identical to that of image retargeting described above. Since the original image frame is used as guidance in the filtering processes, the presently preferred method is able to naturally maintain the temporal coherence in the retargeted video without the need of special care. For a video of 640×256, the present method achieves 15 fps with pre-computed saliency or 6 fps including saliency calculation using the above-mentioned PC. The present method does not consider the global camera motion and thus works on videos by nearly fixed cameras. However, camera motion can be compensated by frame registration, as it is known in the art.

In summary, the above-described importance filtering algorithm for content-aware image retargeting directly uses the original image as the constraint to filter and estimate pixel importance so that it is consistent with the original image's pictured structure. This is a key to minimize visual distortion and while preserving prominent image contents. The constraint is applied on the gradient of pixel shift, instead of directly on pixel shift. This further avoids undesired distortion such as pixel swap that occurs in many prior art methods. The importance filtering operations are highly efficient and ready for real-time applications. A simple extension to video retargeting is also shown to be promising.

One potential improvement to the importance filtering algorithm is to extend the one-dimensional shift gradients to two dimensions. Even though the pixels all shift along the same dimension, the shift-map on the two dimension image has a two dimension gradient field.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of retargeting a digital original image to a digital target image, said method comprising:
    (a) accessing said original image, wherein the size of at least one dimension of said original image is different than the size of the corresponding one dimension in said target image, and a scaling factor relates the size of said one dimension of said original image to the size of said corresponding one dimension in said target image;
    (b) constructing an image saliency of said original image;
    (c) filtering the image saliency under the guidance of said original image to produce an importance map, $S^{Imp}$, that matches pixels to salient structures in said original image;
    (d) estimating a shift-map gradient G according to said scaling factor and under the constraint of said importance map $S^{Imp}$, wherein pixels that are matched to salient structures are assigned a consistently distributed gradient;
    (e) defining a shift-map M from said shift-map gradient G, wherein said shift-map M estimates pixel shifts from said original image to said target image; and
    (f) applying said shift-map M to said original image to construct said target image;
    wherein in step (c):
    said importance map $S^{Imp}$ defines salient structures, said salient structures being important structures preserved in said target image; and
    for each defined salient structure, the pixels matched to the defined structure constitute a group of matched pixels, and the matched pixels within each group are assigned smoothly distributed salient measures.

2. The method of claim 1, wherein in step (b), said image saliency defines a saliency measure for each pixels of said original image, said saliency measure being computed from local image features within said original image according to the saliency of said features.

3. The method of claim 1, wherein in step (c), said image saliency is filtered under the guidance of the whole of said original image by using a guided filter.

4. The method of claim 1, wherein in step (c), a face detector is incorporated into the filtering of the image saliency to identify the pixels matched to salient structures, and salient structures are determined from saliency measures in said image saliency.

5. The method of claim 1, wherein said matched pixels within each group are assigned substantially similar salient measures.

6. The method of claim 1, wherein in step (d), said shift-map gradient G defines each pixel's shift relative to its neighboring pixels.

7. The method of claim 1, wherein in step (d), said consistently distributed gradient is substantially the same gradient value indicative of a minimal shift relative to neighboring pixels.

8. The method of claim 1, wherein in step (d), said consistently distributed gradient is nonlinearly related to said scaling factor.

9. The method of claim 8, wherein said consistently distributed gradient is lower than a gradient linearly related to said scaling factor.

10. The method of claim 1, wherein in step (d), said consistently distributed gradient is effective for maintaining distortion of said salient structure lower than distortion of unimportant regions of said original image, as defined by said importance map $S^{Imp}$.

11. The method of claim 1, wherein in step (d):
said importance map $S^{Imp}$ is normalized so that $S^{Imp}(x, y) \in [0,1]$;
said shift-map gradient G renders bigger gradients for pixels whose importance value as defined by said normalized importance map $S^{Imp}$ approach 0, and renders smaller gradients for pixels whose importance value as defined by said normalized importance map $S^{Imp}$ approach 1.

12. The method of claim 11, wherein said shift-map gradient G is non-linear and gradient values drop faster as importance values approach 1.

13. The method of claim 12, wherein gradient values drops faster when importance values are above 0.75 than when gradient values are not above 0.75.

14. The method of claim 11, wherein the shift-map gradient G is defined as:

$$G(x, y) = \left[ C \cdot e^{-\left(\frac{S^{Imp}(x,y)}{\sigma}\right)^2} \right] \cdot |\alpha - 1|$$

where $\alpha$ is a scaling factor, $\sigma$ is the variance and C is a normalization term.

15. The method of claim 11, wherein the shift-map gradient G is defined as:

$$G(x, y, \alpha) = C_1 \cdot |\alpha - 1| e^{-\alpha 2\sigma^2 \cdot \left(\frac{S^{Imp}(x,y)}{\sigma}\right)^2}$$

where $\alpha$ is a scaling factor, $\sigma$ is the variance, and $C_1$ is a normalization term.

16. The method of claim 11, wherein the shift-map gradient G is defined as:

$$G(x, y, \alpha) = C_2 \cdot |\alpha - 1| e^{-\left(\frac{\alpha \cdot S^{Imp}(x,y)}{\sigma}\right)^2}$$

where $\alpha$ is a scaling factor, $\sigma$ is the variance, and $C_2$ is a normalization term.

17. The method of claim 11, wherein the shift-map gradient G is defined as:

$$G(x, y, \alpha) = C_3 \cdot |\alpha - 1| e^{-|\alpha-1| \cdot \left(\frac{S^{Imp}(x,y)}{\sigma}\right)^2}$$

where $\alpha$ is a scaling factor, $\sigma$ is the variance, and $C_3$ is a normalization term.

18. The method of claim 1, wherein in step (e), the defining of said shift-map M from said shift-map gradient G, includes integrating the shift-map gradient G by a weighted filtering process, wherein pixels matched to salient structures are weighted higher than pixels not matched to salient structures.

19. The method of claim 1, wherein shift-map M is defined by the following optimization:

$$M = M_{opt} = \min_{M'} |\nabla_x M' - G|$$

$$s.t. M'(0,y) = 0, M'(X,y) = |X' - X|$$

where M' is a pixel shift that when optimized renders the final shift-map M, X is dimensional coordinate of a pixel in said original image along said one dimension of the original image, X' is dimensional coordinate of the corresponding pixel in said target image along the corresponding one dimension in said target image, and x and y are coordinate in a two dimensional system including said one dimension of the original image.

20. The method of claim 1, wherein shift-map M is defined by following relationship:

$$M(x, y) = \frac{\sum_{j=y-r}^{y+r} w(x, j)[M'(x-1, j) + G(x, j)]}{\sum_{j=y-r}^{y+r} w(x, j)}$$

where x and y are coordinates in a two dimensional system including said one dimension of the original image, r is a fraction of a dimension of the target image, and w is a weight for assuring that pixels with higher importance are affected less than pixels with lower importance.

21. The method of claim 20, wherein weight w is defined as $w(x,y) = e^{S^{Imp}(x,y)}$.

* * * * *